United States Patent [19]

Van Hoyweghen et al.

[11] Patent Number: 5,367,049

[45] Date of Patent: Nov. 22, 1994

[54] PROCESS FOR THE MANUFACTURE OF POLY(ARYLENE SULPHIDE)

[75] Inventors: Danny Van Hoyweghen, Heverlee; Jean-Marc Coisne, Jemeppe-Sur-Sambre, both of

[73] Assignee: Solvay (Société Anonyme), Brussels,

[21] Appl. No.: 106,980

[22] Filed: Aug. 16, 1993

[30] Foreign Application Priority Data

Sep. 25, 1992 [BE] Belgium .............. 09200842

[51] Int. Cl.$^5$ ............................ C08G 75/14
[52] U.S. Cl. .................................. 528/388
[58] Field of Search .......................... 528/388

[56] References Cited

U.S. PATENT DOCUMENTS

| | | | |
|---|---|---|---|
| 3,354,129 | 11/1967 | Edmonds et al. | 528/388 |
| 3,919,177 | 11/1975 | Campbell | 528/388 |
| 4,350,810 | 9/1982 | Tieszen et al. | 528/388 |
| 5,151,495 | 9/1992 | Inoue et al. | 528/388 |

FOREIGN PATENT DOCUMENTS

| | | |
|---|---|---|
| 0100551A3 | 2/1984 | European Pat. Off. . |
| 0100551 | 2/1984 | European Pat. Off. . |
| 0166363 | 1/1986 | European Pat. Off. . |
| 0226998A2 | 7/1987 | European Pat. Off. . |
| 0323723A2 | 7/1989 | European Pat. Off. . |
| 0323723 | 7/1989 | European Pat. Off. . |
| 0325061 | 7/1989 | European Pat. Off. . |
| 0325061A2 | 7/1989 | European Pat. Off. . |
| 0348189A2 | 12/1989 | European Pat. Off. . |
| 0348189 | 12/1989 | European Pat. Off. . |
| 0355449 | 2/1990 | European Pat. Off. . |
| 0355499A2 | 2/1990 | European Pat. Off. . |
| 355499 | 2/1990 | European Pat. Off. . |
| 0374719A2 | 6/1990 | European Pat. Off. . |
| 0226998B1 | 5/1992 | European Pat. Off. . |
| 62-190228 | 8/1987 | Japan . |

OTHER PUBLICATIONS

Database WPIL; Week 8806, Apr. 6th, 1988; Derwent Publications Ltd., London, GB; AN 88-038299 & JP-A-62 190 228 (Dainippon Ink); Aug. 20th, 1987.

*Primary Examiner*—John Kight, III
*Assistant Examiner*—Terressa M. Mosley
*Attorney, Agent, or Firm*—Spencer, Frank & Schneider

[57] ABSTRACT

Process for the manufacture of poly(arylene sulphide) consisting in polymerizing, in one stage, a reaction mixture comprising the following constituents:
 an alkali metal sulphide (a);
 a polar organic solvent (b);
 an alkali metal carboxylate (c);
 water (d);
 a dihalogenated aromatic compound (e); characterized by the combination, in the said mixture, of a molar ratio ($R_{H_2O}$) of the water (d) to the sulphide (a) used such that:

$$2.6 \leq R_{H_2O} \leq 3.8$$

and of a molar ratio ($R_{ADD}$) of the carboxylate (c) to the sulphide (a) used such that:

$$0.20 \leq R_{ADD} \leq 0.90$$

9 Claims, No Drawings

PROCESS FOR THE MANUFACTURE OF POLY(ARYLENE SULPHIDE)

FIELD OF THE INVENTION

The present invention relates to a process for the manufacture of poly(arylene sulphide), more particularly of poly(phenylene sulphide), from dihalogenated aromatic compounds and alkaline-earth metal sulphides.

TECHNOLOGY REVIEW

Poly(arylene sulphide)s (hereinafter called more simply PASs), such as poly(phenylene sulphide) (hereinafter called more simply PPS) have excellent thermal stability and very good chemical resistance which make them a material of choice for the moulding of components which can be used especially in electrical and electronic applications and in the automobile industry.

A well-known process for the manufacture of PAS comprises heating an alkali metal sulphide, most often hydrated sodium sulphide, in a polar solvent in order to remove the water of hydration therefrom, followed by the addition of a dihalogenated aromatic compound, in particular p-dichlorobenzene, and polymerization at a higher temperature [see, for example, U.S. Pat. No. 3,354,129 (Phillips Petroleum)]. This process, however, does not lead to PASs of sufficiently high molecular weight.

It has already been proposed to overcome this disadvantage by introducing, into the medium for polymerization of the PAS, additives which make it possible to increase the degree of polymerization of the latter. Alkali metal carboxylates have been shown to be efficient additives [U.S. Pat. No. 3,919,177 (Phillips Petroleum)].

The use of these additives, however, has a disadvantage to the extent that, in order for them to be effective, it is generally necessary to use a large amount, substantially equimolar to the amount of alkali metal sulphide. Besides the cost of these additives, this large amount has the disadvantage of bringing about the presence of significant amounts of organic acids which pollute the waste waters resulting from the recovery of the PAS.

It has also been proposed to manufacture high molecular weight PASs, without making use of these additives, by carrying out the reaction in two stages in the presence of water: in a first stage, a prepolymer is prepared by reacting an alkali metal sulphide with a dihalogenated aromatic compound in the presence of an organic amide containing 0.5 to 2.4 mol of water per mole of sulphide; in a second stage, carried out in the presence of 2.5 to 7 mol of water per mole of sulphide, the prepolymer is maintained at a high temperature (245° to 290° C.) in a two-phase system for 1 to 50 hours [Patent Application EP-A-0,166,368 (Kureha)].

This process has the disadvantage of having to be carried out in two stages, which complicates the execution thereof and increases the duration thereof. Moreover, the water content of the medium during the first stage must be strictly maintained at relatively low values if it is desired to prevent decomposition of the PAS formed. These values are less than the water content of the commercially available alkali metal sulphides which are generally strongly hydrated salts, such as trihydrates, pentahydrates and nonahydrates, which implies a dehydration stage of these sulphides and the removal of the excess water before being able to carry out the polymerization proper.

It has also been proposed to carry out the synthesis of high molecular weight PAS in reactors in which the parts in contact with the reaction mixture consist of or are coated with titanium, which makes it possible to avoid the dehydration stage of the sulphide [Patent Application EP-A-226,998 (Kureha)]. To avoid decomposition reactions during the polymerization, it remains necessary, however, to carry out the reaction in two stages, the first stage having to be carried out for a long period of time at low temperature.

Finally, it has been proposed to carry out the synthesis of high molecular weight PAS by carrying out the reaction in the presence, at the same time, of water and of an alkali metal carboxylate (Patent Application EP-A-0,374,719 (Phillips Petroleum)]. According to this process, the amount of alkali metal carboxylate must be between 0,002 and 0.05 mol per mole of alkali metal sulphide and the amount of water present during the polymerization must be between 1.02 and 2.1 mol per mole of alkali metal sulphide.

Controlling the water content of the polymerization medium between these relatively low values involves, in its turn, a dehydration stage of the sulphur source used (sodium sulphide and the product of the reaction between sodium hydrogensulphide and sodium hydroxide in aqueous solution).

The present invention is consequently targeted at providing a process for the manufacture of high molecular weight PAS, carried out in one stage and in the presence, jointly, of water and of an alkali metal carboxylate, which does not have the disadvantages of the processes mentioned above.

SUMMARY OF THE INVENTION

To this end, the invention relates to the manufacture of poly(arylene sulphide) consisting in polymerizing, in one stage, a reaction mixture comprising the following constituents:

an alkali metal or alkaline-earth metal sulphide (a);
a polar organic solvent (b);
an alkali metal or alkaline-earth metal carboxylate (c);
water (d);
a dihalogenated aromatic compound (e);

characterized by the combination, in the said mixture, of a molar ratio $R_{H_2O}$ of the water (d) to the sulphide (a) used such that:

$$2.6 \leq R_{H_2O} \leq 3.8$$

and of a molar ratio ($R_{ADD}$) of the carboxylate (c) to the sulphide (a) used such that:

$$0.20 \leq R_{ADD} \leq 0.90$$

DETAILED DESCRIPTION OF THE INVENTION

Alkali metal or alkaline-earth metal sulphide (a) Alkali metal or alkaline-earth metal sulphides (a) which can be used in the process according to the invention are understood to denote not only the said sulphides introduced as such into the medium for the manufacture (polymerization) of the PAS, before the latter, but also the sulphides arising from the reaction between a suitable sulphur source and a suitable base, before or during polymerization. Examples of alkali metal sulphides which can be introduced as such into the medium for the manufacture of the PAS are sodium, potassium, lithium, rubidium and caesium sulphides and their mixtures. The examples of alkaline-earth metal sulphides which can be introduced as such into the medium for the manufacture of the PAS are calcium, barium and strontium sulphides and their mixtures. These sulphides can be used in the anhydrous form, in the form of hydrates or in the form of aqueous solutions. Among these sulphides, sodium sulphides are preferred for reasons of accessibility, and very particularly sodium sulphide trihydrate.

These sulphides, especially the sodium sulphides, can contain, as traces in the form of impurities, a hydrogensulphide and a thiosulphate. These compounds can advantageously be converted to sulphide "in situ" by reacting with a suitable amount of the corresponding metal hydroxide.

As mentioned above, the sulphides (a) which can be used according to the invention can also arise from the reaction between a suitable sulphur source and a suitable base. Examples of suitable sulphur sources are alkali metal and alkaline-earth metal thiosulphates and hydrosulphides, hydrogen sulphide and carbon disulphide. These sulphur sources have to react, before or during polymerization, with a suitable base so as to generate the sulphide present during polymerization. Examples of suitable bases are the hydroxides and carbonates of the corresponding metals. Although the amount of base reacted with the sulphur source can vary depending on the specific nature of the latter, this amount is generally between the stoichiometric amount and an excess of 0.50 mol with respect to the latter, preferably between the stoichiometric amount and an excess of 0.25 mol with respect to the latter.

Polar organic solvent (b)

The process of manufacture of PAS according to the invention is carried out in a polar organic solvent (b) generally chosen from aprotic organic solvents such as amides, lactams, urea derivatives and cyclic organophosphorus compounds. Amides and lactams are preferably used.

Amides which can be used are, for example, formamide and its N-substituted derivatives such as N,N-dimethyl formamide; acetamide and its N-substituted derivatives such as N,N-dimethylacetamide, N,N-diethylacetamide and N,N-dipropylacetamide; N,N-dimethylbenzamide, and the like.

Lactams which can be used are, for example, caprolactam and its N-substituted derivatives such as the N-alkylcaprolactams, for example N-methylcaprolactam, N-ethylcaprolactam, N-(n-propyl)caprolactam, N-isopropylcaprolactam, N-(n-butyl)caprolactam, N-isobutylcaprolactam and N-cyclohexylcaprolactam; pyrrolidone and its N-substituted derivatives such as the N-alkylpyrrolidones, for example N-methyl-2-pyrrolidone, N-ethyl-2-pyrrolidone, N-(n-propyl)-2-pyrrolidone, N-isopropyl-2-pyrrolidone, N-(n-butyl)-2-pyrrolidone, N-isobutyl-2-pyrrolidone, N-cyclohexyl-2-pyrrolidone, N-methyl-3-methyl-2-pyrrolidone, N-ethyl-3-methyl-2-pyrrolidone and N-methyl-3,4,5-trimethyl-2-pyrrolidone; α-piperidone and its N-substituted derivatives such as N-methyl-2-piperidone, N-ethyl-2-piperidone, N-propyl-2-piperidone, N-isopropyl-2-piperidone, N-methyl-6-methyl-2-piperidone, N-methyl-3-ethyl-2-piperidone, and the like.

Other examples of polar organic solvents are tetramethylurea, N,N'-dimethylethyleneurea, N,N'-dimethylpropyleneurea, 1-methyl-1-oxosulphorane, 1-ethyl-1-oxosulphorane, 1-phenyl-1-oxosulphorane, 1-methyl-1-oxophosphorane, 1-(n-propyl)-1-oxophosphorane, 1-phenyl-1-oxophosphorane, and the like.

Particularly preferred polar organic solvents are the N-alkyllactams and the N-alkylpyrrolidones, very particularly N-methylpyrrolidone.

Alkali metal or alkaline-earth metal carboxylate (c)

The reaction mixture which is subjected to polymerization according to the invention contains an alkali metal or alkaline-earth metal carboxylate (c) in critical amounts which will be specified later. Alkali metal or alkaline-earth metal carboxylates are understood to denote the salts derived from a carboxylic acid and from the metals set out with respect to the sulphide (a).

Among all the salts derived from carboxylic acids and from these metals, there may be mentioned, by way of examples, those which are derived:

from aliphatic monoacids: in particular formates, acetates, propionates, butyrates, valerates, hexanoates, laurates and cyclohexylacetates;

from aliphatic polyacids: in particular oxalates, malonates, succinates, glutarates, adipates, pimelates, suberates, azelates and sebacates;

from aromatic monoacids: in particular benzoates, toluates, phenylacetates, β-phenylpropionates and γ-phenylbutyrates;

from aromatic polyacids: such as phthalates, isophthalates and terephthalates.

Preferred carboxylates are the salts derived from aliphatic monoacids and from alkali metals. Sodium acetate is very particularly preferred.

Water (d)

The mixture subjected to polymerization according to the invention contains water (d) in critical amounts which will be specified later.

The water (d) contained in the said mixture can:

(1) be present in the form of water of hydration of the sulphide (a) and/or (2) be introduced in the form of free water into the mixture and/or (3) be generated by the reaction between a suitable sulphur source and a suitable base, as mentioned above, for the "in situ" formation of the sulphide (a). For example, approximately one mole of water is generated for each mole of alkali metal or alkaline-earth metal sulphide by the reaction of one mole of hydrogensulphide of the said metal with one mole of the corresponding hydroxide.

Dihalogenated aromatic compound (e)

The reaction mixture which is subjected to polymerization according to the invention contains a monomer, intended to react with the sulphide (a), which is chosen from dihalogenated aromatic compounds.

Dihalogenated aromatic compound which can be used in the process according to the invention is understood to denote compounds containing at least one aromatic ring and containing at least two halo constituents.

It can be:

a dihalobenzene such as o-dichlorobenzene, m-dichlorobenzene, p-dichlorobenzene, o-dibromobenzene, m-dibromobenzene, p-dibromobenzene, p-diiodobenzene, 1-chloro-4-bromobenzene and 1-chloro-4-iodobenzene;

a substituted dihalobenzene such as 2,5-dichlorotoluene, 2,5-dichloro-p-xylene, 1-ethyl-2,5-dichlorobenzene, 1-ethyl-2,5-dibromobenzene, 1-ethyl-2-bromo-5-chlorobenzene, 1,2,3,5-tetramethyl-3,6-dichlorobenzene, 1-cyclohexyl-2,5-dichlorobenzene, 1-phenyl-2,5-dichlorobenzene, 1-benzyl-2,5- dichlorobenzene, 1-phenyl-2,5-dibromobenzene, 1-(p-toluyl)-2,5-dichlorobenzene, 1-(p-toluyl)-2,5-dibromobenzene and 1-hexyl-2,5-dichlorobenzene;

a dihalobiphenyl such as 4,4'-dichlorobiphenyl;

a dihalobiphenyl alkane such as 2,2'-di(p-chlorophenyl)propane;

a dihalonaphthalene such as 1,4-dichloronaphthalene, 1,6-dichloronaphthalene, 2,6-dichloronaphthalene, 1,6-dibromonaphthalene and 2,6-dibromonaphthalene;

a dihalogenated aromatic carboxylic acid such as 3,5-dichlorobenzoic acid;

a dihalodiphenyl derivative such as 4,4'-dichlorodiphenyl ether, 4,4'-dichlorodiphenyl ketone, 4,4'-dichlorodiphenyl sulphide, 4,4'-dichlorodiphenyl sulphoxide and 4,4'-dichlorodiphenyl sulphone.

Among all these dihalogenated aromatic compounds, the p-dihalobenzenes are preferred and, among the latter, very particularly p-dichlorobenzene.

The use of several different dihalogenated aromatic compounds also comes within the scope of the invention. By a suitable choice and combination of these compounds, it is possible to obtain copolymers which have two or several different repeat units. It can concern block copolymers or statistical copolymers.

Other ingredients

The introduction, into the medium for the manufacture (polymerization) of the PAS, of trihalogenated aromatic compounds also comes within the scope of the invention.

Examples of such compounds are 1,2,3-trichlorobenzene and 1,2,4-trichlorobenzene. Used in small amounts (approximately $1 \cdot 10^{-4}$ to approximately $1 \cdot 10^{-2}$ mol per mole of dihalogenated aromatic compound), these compounds lead to the production of PAS having a low degree of branching and of higher molecular weight.

Polymerization

The polymerization conditions suitable for the implementation of the process according to the invention can vary to a large extent. The general conditions and characteristics of the polymerization are detailed below.

The reaction mixture is constituted by bringing into contact with each other at least all the ingredients (a) to (e) defined above in respective amounts which will be described hereinbelow. This bringing into contact can be carried out by introducing the said ingredients together or successively and in any order into the polymerization medium.

According to the invention, the polymerization is carried out in one stage.

"Polymerization carried out in one stage" must be understood to mean that the reaction mixture is brought, progressively and without any intermediate stationary stage, to the polymerization temperature. This temperature is greater than 235° C. and less than the decomposition temperature of the PAS.

Preferably, the temperature of the reaction mixture is raised continuously and without any stationary stage from room temperature (approximately 25° C.) to more than 235° C. during a period of 30 minutes to 10 hours, in particular from 1 to 2 hours.

The polymerization temperature preferably ranges from approximately 240° C. to approximately 290° C., very particularly from 240° to 270° C. Within these limits, the reaction mixture can be maintained at a specified temperature for a period of 1 to 30 hours, preferably from 1 to 10 hours. Within these limits, also, the reaction mixture can be maintained at at least one intermediate temperature stationary stage, for example for half the complete duration of the polymerization.

The polymerization pressure is generally autogenous and sufficient to maintain the dihalogenated aromatic compound and the water contained in the reaction mixture in the liquid form.

The essential ingredients of the reaction mixture are generally present in the respective amounts and ratios defined hereinbelow.

The amount in which the polar organic solvent (b) used for carrying out the process according to the invention is used is not critical and can vary within a wide range. Expressed by weight, this amount is generally from 0.5 to 20 times the weight of sulphide (a) used; preferably, the amount of polar organic solvent (b) is from 1 to 10 times, very particularly from 2 to 5 times, the weight of sulphide (a).

To obtain PASs of sufficiently high molecular weight, the dihalogenated aromatic compound (e) is used at a rate of 0.9 to 1.1 mol per mole of sulphide (a); preferably, the compound (e) is used at a rate of 0.98 to 1.05 tool per mole of sulphide (a).

The molar ratio of the water (d) to the sulphide (a) used is one of the essential characteristics of the process according to the invention. This ratio (hereinafter called $R_{H2O}$) must be such that it satisfies the relationship:

$$2.6 \leq R_{H2O} \leq 3.8$$

Preferably, $R_{H2O}$ is such that:

$$2.7 \leq R_{H2O} \leq 3.5$$

Particularly favourable results were obtained with $R_{H2O}$ values such that:

$$2.8 \leq R_{H2O} \leq 3.3$$

It will consequently be understood that a very particularly preferred embodiment of the process according to the invention involves the use, as such and without a prior dehydration stage, of commercial sodium sulphide trihydrate as sulphide (a).

"Water (d) used" and "sulphide (a) used" must be understood to mean both the amounts of these constituents which are introduced into the reaction mixture and those which can be generated therein as mentioned above.

The molar ratio of the alkali metal carboxylate (c) to the sulphide (a) used is another essential characteristic of the process according to the invention. This ratio (hereinafter called $R_{ADD}$) must be such that it satisfies the relationship:

$$0.20 \leq R_{ADD} \leq 0.90$$

Preferably, $R_{ADD}$ is such that:

$$0.20 \leq R_{ADD} \leq 0.80$$

Particularly favourable results were obtained with $R_{ADD}$ values such that:

$$0.30 \leq R_{ADD} \leq 0.75$$

It will be noticed that, in order to achieve the objective targeted by the present invention, namely to produce PAS, in particular PPS, of high molecular weight, in a single stage, it is not sufficient that each of the ratios $R_{H2O}$ or $R_{ADD}$ is individually satisfactory. It is essential that the reaction mixture satisfies, at the sax, e time, the spheres of values of $R_{H2O}$ and $R_{ADD}$ mentioned above, it being possible for the best compromise of the pair of values of $R_{H2O}$ and $R_{ADD}$ within the defined spheres to be easily achieved by a few routine tests.

After its manufacture, the PAS obtained can be separated from the polymerization medium by any conventional means. For example, the cooled polymer suspension can be filtered, and the polymer collected can be washed with water and dried.

The PASs obtained according to the process of the invention can be conventionally mixed with other polymers, pigments, fillers (glass fibers, talc, calcium carbonate, silica, mica, metal powders, quartz powder, glass beads, carbon fibers, graphite, carbon black, and the like), stabilizing agents, lubricating agents, and the like.

The PASs obtained according to the process of the invention can be converted by known moulding methods to injected articles, for use in electrical, electronic and mechanical applications, to films and to fibers. They can also constitute the base of liquid coating compositions, compositions for encapsulating microelectronic components or also the matrix of thermally and mechanically resistant composites.

The following examples illustrate the invention.

EXAMPLE 1

A 1 liter titanium autoclave is charged with:
70 g of $Na_2S \cdot 3H_2O$ containing 0.52 mol of $Na_2S$, 0.03 mol of NaHS and 1.55 mol of water;
1.77 g (0.04 mol) of NaOH;
81.46 g (0.55 mol) of para-dichlorobenzene (PDCB);
1.24 g (0.07 mol) of water;
220 g of N-methylpyrrolidone (NMP);
27.04 g (0.33 mol) of sodium acetate (AcONa).

Taking into account the exchange reactions which take place between the sulphur-containing impurities of $Na_2S \cdot 3H_2O$ and sodium hydroxide (NaOH), the effective content in the reaction mixture of $Na_2S$ is 0.55 mol and the effective water content in the medium is 1.65 mol.

The $R_{H2O}$ and $R_{ADD}$ values are thus the following:

$R_{H2O} = 3$ $R_{ADD} = 0.6$

After having closed the autoclave, it is pressurized under 2 bars of nitrogen.

The temperature is brought to 265° C. with an external electrical oven. The reaction mixture is maintained at 265° C. for 3 hours with stirring.

After cooling, the mixture is removed from the autoclave and treated with an excess of water. The polymer is washed with water until salt in the filtrate has disappeared.

The polymer is then washed twice with acetone in order to extract the oligomers which are soluble in this solvent. At the end of the second washing, granules of different sizes are separated by passing the polymer, suspended in acetone, through a 250 μm sieve. After a separate filtration of the two particle size phases, the polymers are dried in an oven under vacuum at 80° C.

The polymer yield is the following:

2% extracted with acetone
8% fine granules (<250 μm)
85% large granules (>250 μm).

The conversion of monomers is approximately 97%.

The inherent viscosity ($\eta_{inh}$) of the fine granules (measured in 1-chloronaphthalene at 206° C. and at a concentration of 10 g/l) has the value 0.14 dl/g. The $\eta_{inh}$ of the large granules has the value 0.27 dl/g.

EXAMPLE 2

The reaction is carried out as in Example 1, except that the reaction mixture is brought to a temperature of 240° C. for a period of 90 minutes and then to a temperature of 265° C. for a period of 90 minutes.

The polymer collected is separated into two particle size fractions (250 μm sieve). The finest particles (11%) have an $\eta_{inh}$ of 0.16 dl/g. Those of greater particle size (82%) have an $\eta_{inh}$ of 0.28 dl/g.

EXAMPLE 3R

This example is provided by way of comparison.

A 1 l titanium autoclave is charged with 70 g of $Na_2S \cdot 3H_2O$ (0.53 mol of $Na_2S$), 125 g of NMP, 27 g (0.33 mol) of AcONa and 0.89 g (0.022 mol) of NaOH.

The reaction mixture is brought progressively to 208° C. and 37 g of a mixture of NMP and water are distilled. The temperature of the autoclave is then reduced to 160° C., at which temperature the following ingredients are added: a solution of 81.83 g (0.56 mol) of PDCB in 113 g of NMP and an aqueous sodium hydroxide solution containing 0.29 g (0.01 mol) of NaOH in 6.38 g of $H_2O$. The $R_{H2O}$ and $R_{ADD}$ values are respectively 1.5 and 0.6.

The temperature of the reactor is brought to 240° C. for 90 minutes and then to 265° C., also for 90 minutes.

The polymer is separated into two particle size fractions (250 μm sieve). The finest particles (5%) have an inherent viscosity of 0.18 dl/g. Those of greater particle size (86%) have an inherent viscosity of 0.30 dl/g.

It is thus observed that PPS with a molecular weight similar to that of Example 2 can only be obtained at the price of a longer process, carried out in two stages, with prior dehydration of the sodium sulphide.

EXAMPLE 4R

This example is provided by way of comparison.

A 0.5 l titanium autoclave is charged with 50 g of $Na_2S \cdot 3H_2O$ (0.37 mol of $Na_2S$), 154.68 g of NMP, 1.22 g (0.03 mol) of NaOH, 0.36 g of $H_2O$ and 57.41 g (0.39 mol) of PDCB.

The mixture is heated at 265° C. and maintained at this temperature for 3 h.

The polymer obtained (79% yield) has an inherent viscosity of only 0.07 dl/g.

EXAMPLES 5 AND 6R to 10R

Examples 6R to 10R are provided by way of comparison.

The reactions are carried out according to the general procedure of Example 2 but with $R_{H2O}$ and $R_{ADD}$ values which are given in the table below.

The results obtained are also given in this table.

TABLE

| Example | $R_{H2O}$ | $R_{ADD}$ | $\eta_{inh}$ (dl/g) large particles | $\eta_{inh}$ (dl/g) fine particles | Overall yield (%) |
|---------|-----------|-----------|------|------|----|
| 5 | 3 | 0.30 | 0.25 | 0.22 | 95 |

TABLE-continued

| Example | $R_{H2O}$ | $R_{ADD}$ | $\eta_{inh}$ (dl/g) large particles | $\eta_{inh}$ (dl/g) fine particles | Overall yield (%) |
|---|---|---|---|---|---|
| 6R | 3.5 | 0.15 | 0.15 | 0.11 | 86 |
| 7R | 4 | 0.30 | 0.21 | 0.10 | 92 |
| 8R | 4.5 | 0.15 | 0.15 | 0.12 | 85 |
| 9R | 3 | 0.15 | 0.19 | 0.11 | 90 |
| 10R | 4 | 0.60 | 0.20 | 0.13 | 84 |

What is claimed is:

1. A process for the manufacture of poly(arylene sulphide), consisting in the steps of:
   (A) preparing a reaction mixture consisting of the following ingredients:
      (a) an alkali metal or alkaline-earth metal sulphide, which may be anhydrous or hydrated;
      (b) a polar organic solvent;
      (c) an alkali metal or alkaline-earth metal carboxylate selected from formates, acetates, propionates, butyrates, valerates, hexanoates, laurates, cyclohexylacetates, oxalates, malonates, succinates, glutarates, adipates, pimelates, suberates, azelates, sebacates, benzoates, toluates, phenylacetates, β-phenylpropionates, γ-phenylbutyrates, phthalates, isophthalates and terephthalates;
      (d) water;
      (e) a dihalogenated aromatic compound; and
      (f) up to about $1 \times 10^{-2}$ mole per mole of dihalogenated aromatic compound of a trihalogenated aromatic compound; in quantities such that:
         the molar ratio $R_{H2O}$ of the water to the sulphide (a) (i.e. the total number of moles of water, either introduced in the form of free water (d) or present in the form of water of hydration of the sulphide (a), divided by the number of moles of sulphide) is such that $2.6 \leq R_{H2O} \leq 3.8$;
         the molar ratio $R_{add}$ of the carboxylate (c) to the sulphide (a) (i.e. the number of moles of carboxylate divided by the number of moles of sulphide) is such that $0.2 \leq R_{add} \leq 0.9$;
   (B) heating the reaction mixture to a polymerisation temperature, which is greater than 235° C. and less than the decomposition temperature of poly(arylene sulphide);
   (C) maintaining the reaction mixture at the polymerization temperature for about 1 to 30 hours to produce poly(arylene sulphide); and
   (D) separating the poly(arylene sulphide) obtained from the reaction mixture.

2. The process according to claim 1, wherein the sulphide (a) is a sodium sulphide.

3. The process according to claim 1, wherein the solvent (b) is an N-substituted derivative of pyrrolidone.

4. The process according to claim 1, wherein the carboxylate (c) is a salt derived from an aliphatic monoacid and from sodium.

5. The process according to claim 1, wherein the dihalogenated aromatic compound is a p-dihalobenzene.

6. The process according to claim 1, wherein the heating of the reaction mixture to the polymerization temperature in step (B) is progressive and without any intermediate stationary stage from approximately 25° C. to more than 235° C.

7. The process according to claim 1, wherein the reaction mixture is maintained in step (C) at the polymerization temperature from approximately 240° C. to approximately 290° C. for a period for about 1 to 10 hours.

8. The process according to claim 1, applied to the manufacture of poly(phenylene sulphide).

9. A process for the manufacture of poly(phenylene sulphide), consisting in the steps of:
   (A) preparing a reaction mixture consisting of the following ingredients:
      (a) a sodium sulphide, which may be anhydrous or hydrated;
      (b) a N-substituted derivative of pyrrolidone;
      (c) a sodium salt of an aliphatic monoacid;
      (d) water; and
      (e) a p-dihalobenzene; in quantity such that:
         the molar ratio $R_{H2O}$ of the water to the sulphide (a) (i.e. the total number of moles of water, either introduced in the form of free water (d) or present in the form of water of hydration of the sulphide (a), divided by the number of moles of sulphide) is such that $2.6 \leq R_{H2O} \leq 3.8$;
         the molar ratio $R_{add}$ of the carboxylate (c) to the sulphide (a) (i.e. the number of moles of carboxylate divided by the number of moles of sulphide) is such that $0.2 \leq R_{add} \leq 0.09$;
   (B) heating the reaction mixture to a polymerisation temperature, which is greater than 235° C. and less than the decomposition temperature of poly(phenylene sulphide);
   (C) maintaining the reaction mixture at the polymerization temperature for about 1 to 30 hours to produce poly(phenylene sulphide); and
   (D) separating the poly(phenylene sulphide) obtained from the reaction mixture.

* * * * *

UNITED STATES PATENT AND TRADEMARK OFFICE
CERTIFICATE OF CORRECTION

PATENT NO. : 5,367,049
DATED : November 22, 1994
INVENTOR(S) : Danny Van Hoyweghen, and
Jean-Marc Coisne It is certified that error appears in the above-indentified patent and that said Letters Patent is hereby corrected as shown below:

On the title page, item [75] after

"Inventors: Danny Van Hoyweghen, Heverlee;

Jean-Marc Coisne,

Jemeppe-Sur-Sambre, both of"

to include the following: Belgium and [73] after

"Assignee: Solvay (Société Anonyme), Brussels,"

to include the following: Belgium

Signed and Sealed this

Fourteenth Day of February, 1995

Attest:

BRUCE LEHMAN

Attesting Officer        Commissioner of Patents and Trademarks